United States Patent
Jaw

(10) Patent No.: US 7,481,560 B1
(45) Date of Patent: Jan. 27, 2009

(54) HANDGRIP WITH LAMP APPARATUS FOR BICYCLE

(76) Inventor: Leo Jaw, No. 16, Tzu Yu Road, Ta Tu Hsiang, Taichung Hsien (TW)

( * ) Notice: Subject to any disclaimer, the term of this patent is extended or adjusted under 35 U.S.C. 154(b) by 0 days.

(21) Appl. No.: 12/042,464

(22) Filed: Mar. 5, 2008

(51) Int. Cl.
*B62J 6/00* (2006.01)
(52) U.S. Cl. .................. 362/474; 362/473; 362/205; 359/550; 340/432; 16/421
(58) Field of Classification Search ................ 362/473, 362/474, 253, 191, 234, 109; 16/421; 340/432; 359/550
See application file for complete search history.

(56) References Cited

U.S. PATENT DOCUMENTS 2,603,701 A * 7/1952 Schadel, Jr. ............. 340/432
5,247,431 A * 9/1993 Liu ........................ 362/474

* cited by examiner

*Primary Examiner*—Stephen F Husar
(74) *Attorney, Agent, or Firm*—Alan Kamrath; Kamrath & Associates PA

(57) ABSTRACT

A handgrip for bicycle includes a body including a first end, a second end, and a light reflection portion covering thereon between the first and second ends, a sheath mounted on the light reflection portion, a lamp device installed on an end of the sheath adjacent to the second end of the body, and a switch device installed to the body and electrically connected to the lamp device.

14 Claims, 6 Drawing Sheets

HANDGRIP WITH LAMP APPARATUS FOR BICYCLE

BACKGROUND OF THE INVENTION

1. Field of the Invention

The present invention relates to a handgrip with a lamp apparatus for bicycle.

2. Description of the Related Art

A conventional handgrip as shown in reference Taiwan Patent NO M298566, meanwhile, the handgrip composes of a transparent sheath and a lamp unit. The lamp unit is disposed in an end of the interior of the transparent sheath as to make the handgrip to be decorative for signal.

However, the lamp unit is installed in the handgrip so that the size of the lamp unit is limited by the handgrip.

Further, the lamp unit is disposed in the interior of the sheath so that the light of the lamp is easily hid behind the sheath and it causes a bad effect of signal. Additionally, the lamp unit is preferred to be electronic product. Such lamp unit is easy to be broken if placing the lamp unit out of the sheath and making the lamp unit to be exposed. Moreover, to place the lamp unit inside of the sheath may cause difficult maintenance and of the lamp device and replacement of the batteries of the lamp device.

The present invention is therefore intended to obviate or at least alleviate the problems encountered in prior art.

SUMMARY OF THE INVENTION

Accordingly, the object is achieved by providing a handgrip for bicycle that includes a body, a sheath, a lamp device and a switch device. The sheath is mounted on the body. The lamp device is disposed on the second end of the sheath. The lamp device further includes a plurality of lamp elements disposed on the first and second sides respectively. The body further includes a light reflection portion defined between the body and the sheath and adapted to reflect the light that lights up the body to the sheath so that the sheath is allowed to light outward.

Other objects and advantages of the present invention will become apparent from the following detailed description when views in conjunction with the accompanying drawings, which set forth certain embodiment of the invention.

BRIEF DESCRIPTION OF THE DRAWINGS

The present invention will be described via detailed illustration of the preferred embodiment referring to the drawings.

DETAILED DESCRIPTION OF THE PREFERRED EMBODIMENT

Figure 1:
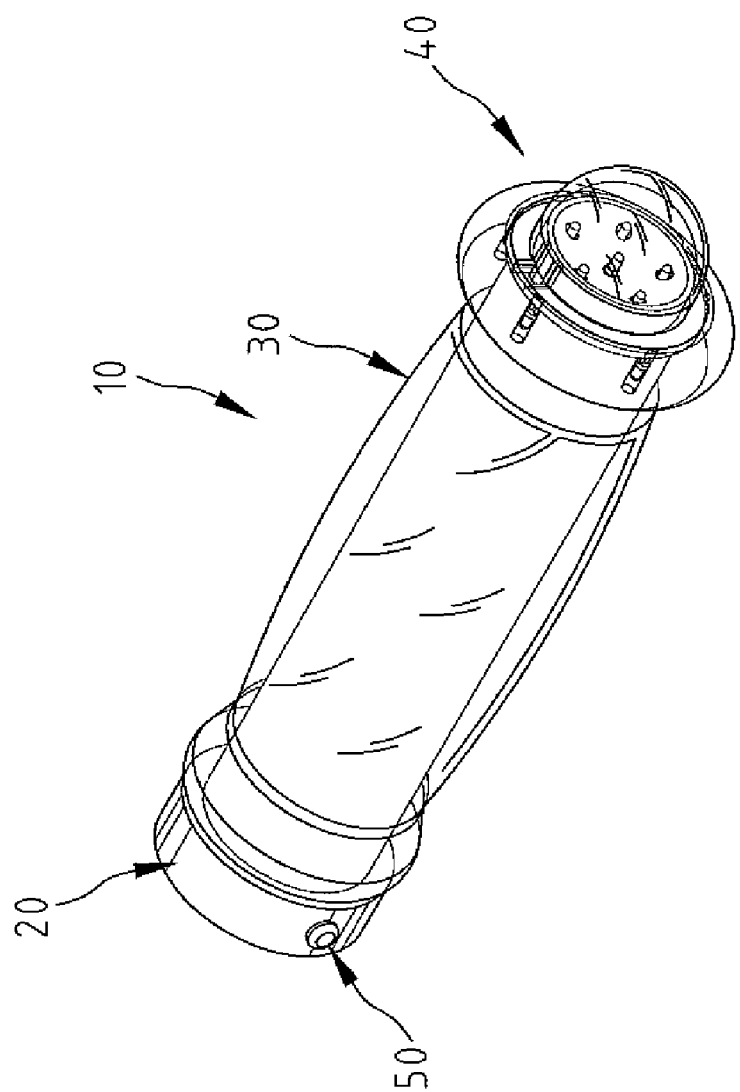
FIG. 1 is a perspective view of a handgrip with a lamp apparatus for bicycle according to the preferred embodiment of the present invention.
Figure 2:
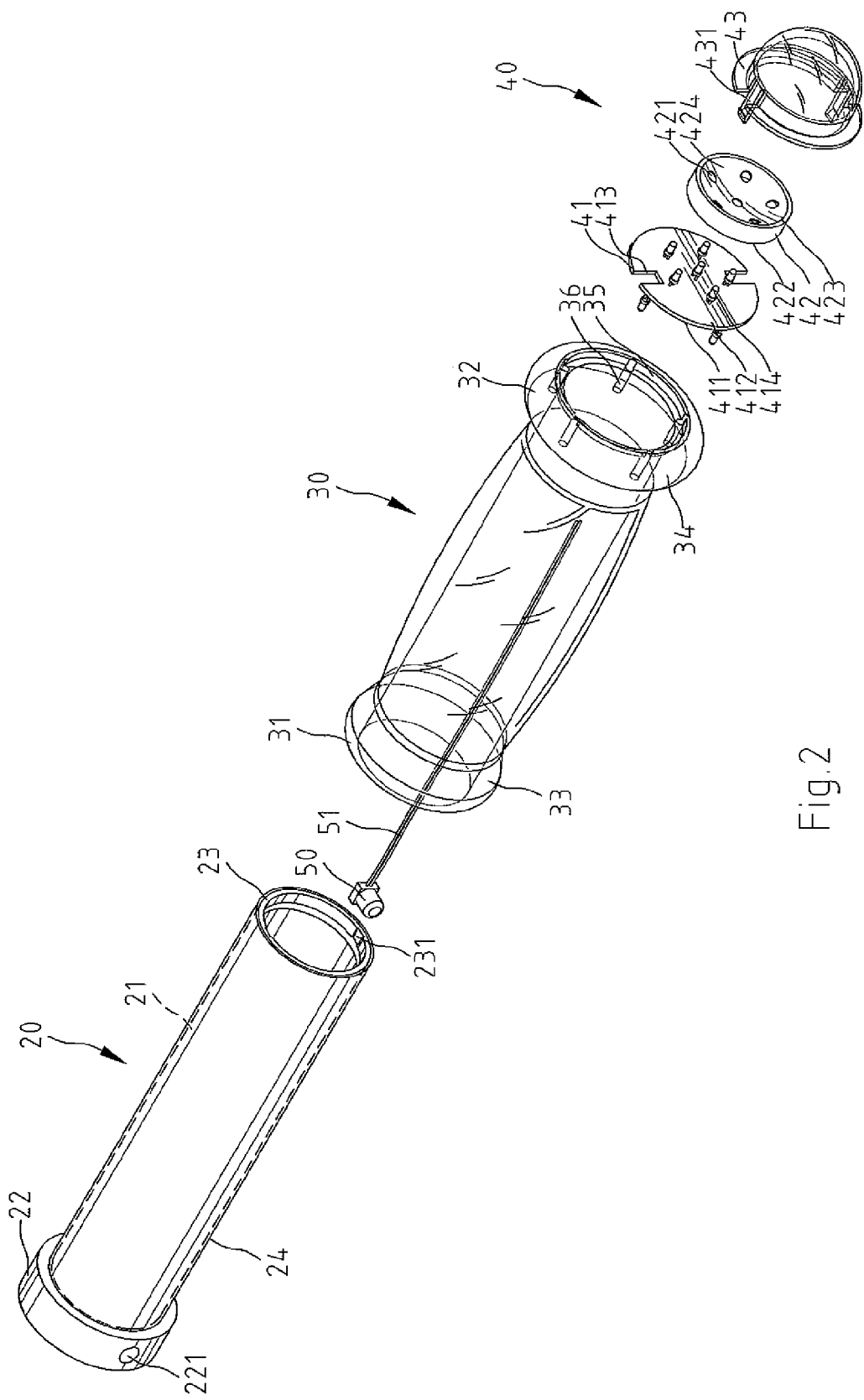
FIG. 2 is an exploded view of the handgrip shown in FIG. 1.

Referring to FIGS. 1 and 2, a handgrip 10 for a bicycle in accordance with a preferred embodiment in the present invention includes a body 20, a sheath 30, a lamp device 40 and a switch device 50.

The body 20 is formed as a hollow cylinder and includes a first end 22, a second end 23, an outer periphery 21 defined between the first and second ends 22, 23 and a light reflection portion 24 wrapping around or applying to the outer periphery 21. A through-hole 221 is formed on the rim of the first end 22 for installation of the switch device 50. A plurality of limited portion 231 is defined on the inner surface of the rim of the second end 23 for installation of the lamp device 40.

The sheath 30 is provided for putting on the body 20 and includes a first end 31 and a second end 32. A first flange 33 and a second flange 34 respectively define on the first and second ends 31, 32. The first and second flanges 33, 34 are ergonomic-designed and provide a comfortable use when a user holds on the sheath 30. A connecting portion 35 is defined on the second end 32 of the sheath 30 and adapted to receive the lamp device 40. A plurality of bores 36 are aligned around the connecting portion 35, with each bore 36 being longitudinally formed on the second end 32. The material of the sheath 30 is made of transparent plastics or rubber so that the sheath 30 is changeable to suit to various sizes of the lamp device 40 and the handgrip 10. Further, on the sheath 30, there could be set some desired designs with differ transmittance as to increase aesthetic perception of the sheath 30.

The lamp device 40 includes a lamp unit 41, a light gathering element 42 and a lamp lid 43. The lamp lid 43 is made of plastic and has several of fastening portion 431.

The lamp unit 41 includes a first side 411 toward the first end 31 of the sheath 30, a second side 412 opposite to the first side 411 and a plurality of apertures 413 defined on the rim thereof. The apertures 413 correspond to the fastening portions 431 of the lamp lid 43 and the limited portions 231 of the second end 23 of the body 20 so that each fastening portion 431 of the lamp lid 43 is adapted to insert through the related aperture 413 to engage with the related limited portion 231 of the body 20 for fixing the lamp unit 41 and the light gathering element 42 in the connecting portion 35 of the sheath 30. The first side 411 is connected to the connecting portion 35 of the sheath 30. Several of lamp elements 414 are disposed on the first and second sides 411 and 412 respectively. The lamp elements 414 on the first side 411 is received in the bores 36 as to prevent said lamp elements 414 being broken by external force because that the bores 36 is located in the second flange 34.

The lamp unit 41 not only lights toward the first side 411 for lighting the sheath 30 but lights toward the second side 412 for lighting the lamp lid 43. The light reflection portion 24 of the body 20 can reflect the light of the lamp elements 414 of the first side 41 to the sheath 30 as to enhance the illumination of the sheath 30. Moreover, the light reflection portion 24 allows decreasing the amount of the lamp elements 414 of the first side 41; hence, it can save power for supplying the lamp elements 414 of the first side 41. Users can operate the lamp device 40 for more long time with the same batteries. In addition, it can reduce the generation of heat energy and prevent users feeling that the handgrip 10 is overheated in use. On the contrary, if the amount of the lamp elements 414 of the first side 411 is maintained invariably, the light reflection portion 24 allows increasing the illumination of the light reflected to the sheath 30 from the lamp elements 414 of the first side 411. It can make the lamp device 40 to have better effect.

The light gathering element 42 is connected to the second side 412 of the lamp unit 41 and includes a first surface 422 toward the second side 412, a second surface 423 opposite to the first surface 422 and a plurality of through-holes 421. Each through-hole 421 is defined through the first and second surfaces 422, 423 and allows the lamp elements 414 which are disposed on the second side 412 of the lamp unit 41 to insert through. The first surface 422 abuts against the second side 412 of the lamp unit 41. A semi-circular cavity 424 is defined on the second surface 423 and full applied with light reflection material, thus, the cavity 424 can reflect the light from the lamp elements 414 of the second side 412 of the lamp unit 41 as to increase the illumination of the lamp lid 43 of the lamp device 40.

The light of the lamp device 40 can travel toward the sheath 30 or the lamp lid 43 or both the sheath 30 and the lamp lid 43 so that users can operate the handgrip 10 in various conditions.

The switch device 50 is preferred to be a multiplex switch and communicates with the lamp unit 41 by a cord 51. The switch device 50 is a conventional structure and not the emphasis in the present invention; therefore, it would not further describe the switch device 50 in great detail.

Figure 3:
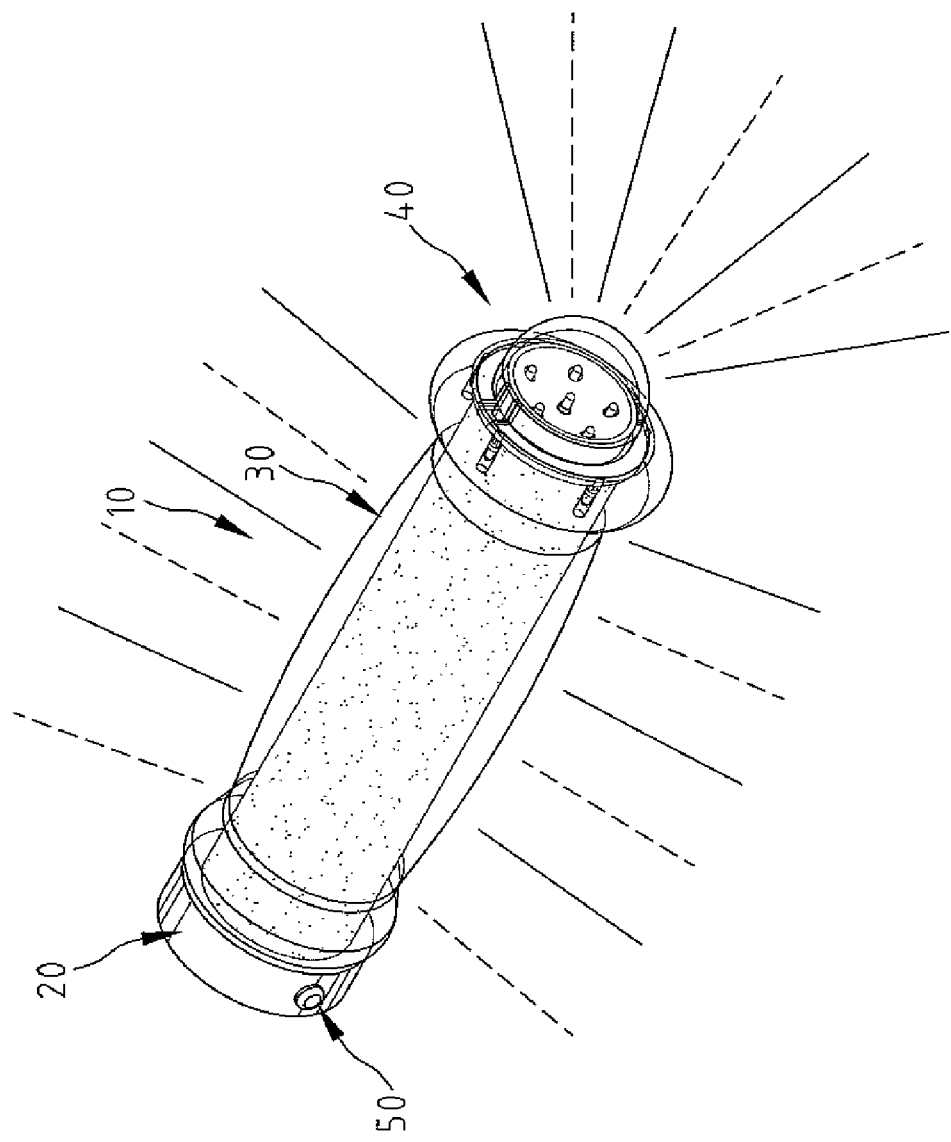
FIG. 3 is another perspective view of the handgrip shown in FIG. 1; illustrating both the first and second sides of the lamp unit are lighted.
Figure 4:
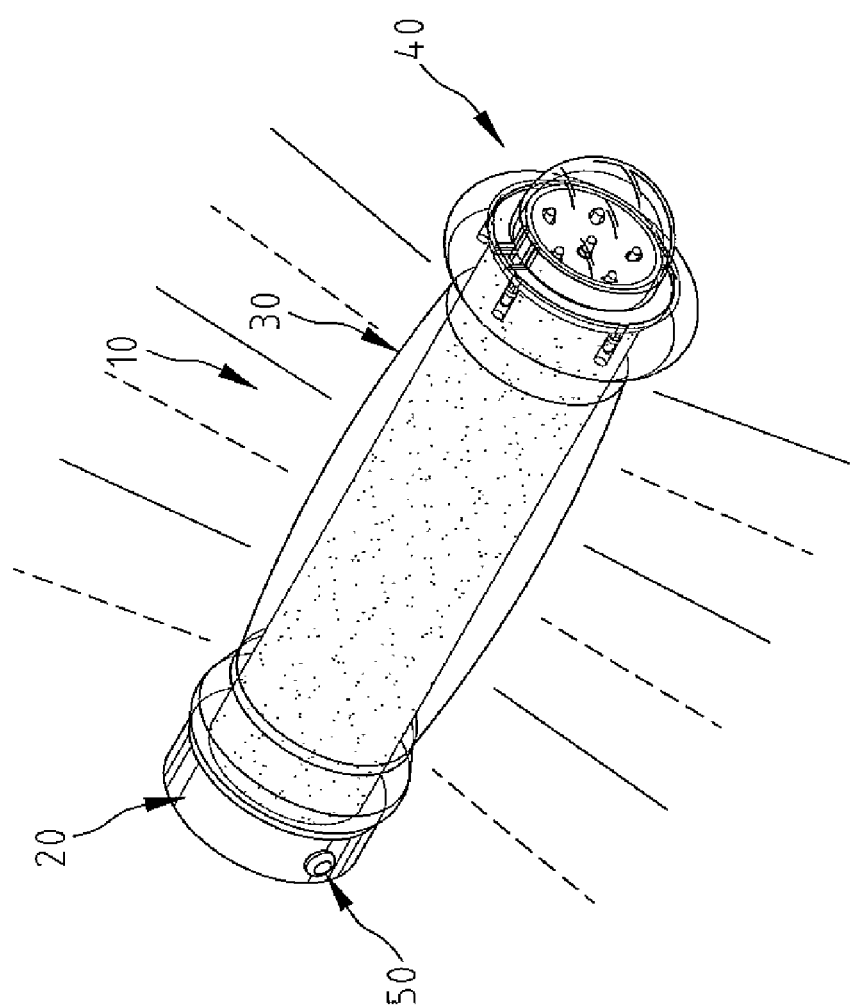
FIG. 4 is another perspective view of the handgrip shown in FIG. 1; illustrating the first side of the lamp unit is lighted.
Figure 5:
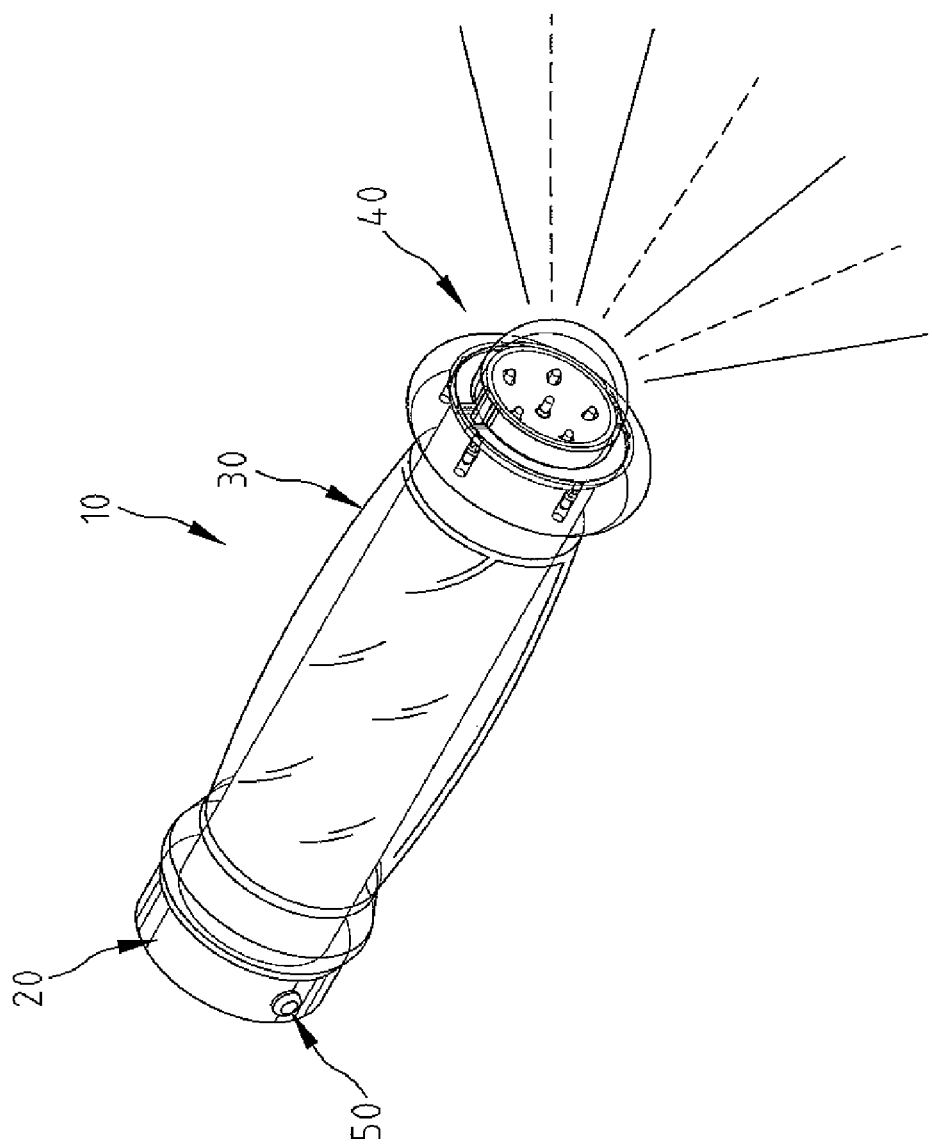
FIG. 5 is another perspective view of the handgrip shown in FIG. 1; illustrating the second side of the lamp unit is lighted.

Referring to FIGS. 3 through 5, the multiplex switch device 50 can be operated to switch either the power switch or the light conditions of the lamp device 40 (i.e. the lamp elements 414 of the first side 41 of the lamp unit 41 are operated to light only; or the lamp elements 414 of the second side 42 of the lamp unit 41 are operated to light only; or both the lamp elements 414 of the first and second sides 41, 42 of the lamp unit 41 are operated to light.)

Figure 6:
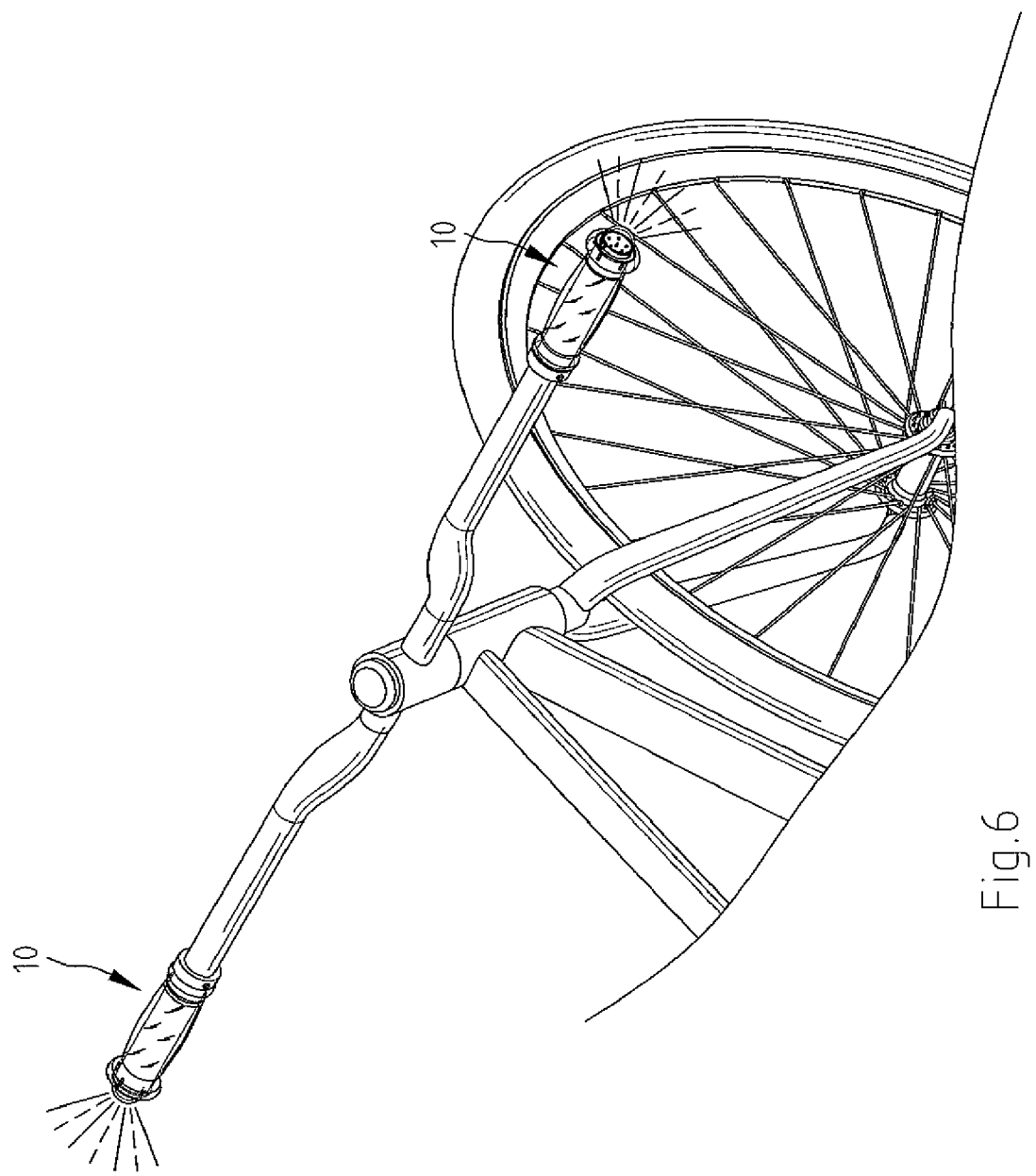
FIG. 6 is a perspective view of two handgrips which are used to be mounted onto two handle bars of a bicycle respectively.

Referring to FIG. 6, it shows two handgrips 10 in accordance with the present invention is provided to be mounted on two handle bars of a bicycle. Users can hold on the handgrips 10 while riding the bicycle (not shown). According to the functions of the switch device 50, while the handgrip 10 is used to be mounted on the handle bar of the bicycle, the handgrip 10 can also be a turn signal. Furthermore, the lamp lid 43 of the handgrip 10 which is adapted to be turn signal is preferred to be transparent plastic with bright colors.

What is claimed is:

1. A handgrip for bicycle comprising:
    a body including a first end, a second end, and a light reflection portion covering thereon between the first and second ends;
    a sheath mounted on the light reflection portion;
    a lamp device installed on an end of the sheath adjacent to the second end of the body; and
    a switch device installed to the body and electrically connected to the lamp device.

2. The handgrip for bicycle as claimed in claim 1, wherein the lamp device further comprising a lamp unit, with the lamp unit having a first side and a second side, with a plurality of lamp elements respectively disposed on the first and second sides of the lamp unit.

3. The handgrip for bicycle as claimed in claim 2, wherein the lamp device further comprising a light gathering element and a lamp lid, with the lamp lid adapted to fix the lamp unit to the end of the sheath, with the light gathering element disposed between the lamp unit and lamp lid.

4. The handgrip for bicycle as claimed in claim 3, with the light gathering element having a plurality of through-holes allowing the lamp elements of the second side of the lamp unit inserting therethrough.

5. The handgrip for bicycle as claimed in claim 3, further comprising several of limited portions defined on the second end of the body and several of fastening portions defined on the lamp lid and corresponding to said limited portions as to fix the lamp lid to the second end of the body.

6. The handgrip for bicycle as claimed in claim 1, further comprising a plurality of bores arranged annularly on the end of the sheath and adapted for receiving the lamp elements of the first side of the lamp unit.

7. The handgrip for bicycle as claimed in claim 1, with the switch device adapted for power switch of the lamp device.

8. The handgrip for bicycle as claimed in claim 1, with the switch device adapted to control the light conditions of the lamp device.

9. The handgrip for bicycle as claimed in claim 1, further comprising a through-hole formed on the first end of the body, with the switch device disposed on the through-hole of the body.

10. The handgrip for bicycle as claimed in claim 1, with material of the sheath being transparent plastic and rubber.

11. The handgrip for bicycle as claimed in claim 1, with material of the sheath being partially transparent plastic and rubber.

12. The handgrip for bicycle as claimed in claim 1, with the sheath having a plurality of designs with differ transmittance.

13. The handgrip for bicycle as claimed in claim 1, with the light reflection portion wrapping on the body.

14. The handgrip for bicycle as claimed in claim 1, with the light reflection portion winding around the body.

* * * * *